US012512259B2

(12) United States Patent
Bustreo et al.

(10) Patent No.: US 12,512,259 B2
(45) Date of Patent: Dec. 30, 2025

(54) SPACER TAPE, METHOD FOR MANUFACTURING A WINDING AND WINDING

(71) Applicant: HITACHI ENERGY LTD, Zürich (CH)

(72) Inventors: Gianluca Bustreo, Mirano (IT); Martina Perin, Pionca di Vigonza (IT); Paolo Pavanello, Granze (IT); Valentina Valori, Monselice (IT); Julia Forslin, Vasteras (SE); Mark Jovalekic, Adelsheim (DE); Orlando Girlanda, Västerås (SE); Robert Platek, Myślenice (PL)

(73) Assignee: HITACHI ENERGY LTD, Zurich (CH)

( * ) Notice: Subject to any disclaimer, the term of this patent is extended or adjusted under 35 U.S.C. 154(b) by 606 days.

(21) Appl. No.: 17/928,563

(22) PCT Filed: Jan. 7, 2022

(86) PCT No.: PCT/EP2022/050259
§ 371 (c)(1),
(2) Date: Nov. 29, 2022

(87) PCT Pub. No.: WO2022/148834
PCT Pub. Date: Jul. 14, 2022

(65) Prior Publication Data

US 2023/0215620 A1 Jul. 6, 2023

(30) Foreign Application Priority Data

Jan. 11, 2021 (EP) .................................... 21150953

(51) Int. Cl.
*H01F 27/32* (2006.01)
*C09J 7/20* (2018.01)
(Continued)

(52) U.S. Cl.
CPC .............. *H01F 27/323* (2013.01); *C09J 7/20* (2018.01); *C09J 7/38* (2018.01); *H01F 41/122* (2013.01);
(Continued)

(58) Field of Classification Search
CPC ........ H01F 27/323; H01F 41/122; C09J 7/20; C09J 7/38; C09J 2203/326;
(Continued)

(56) References Cited

U.S. PATENT DOCUMENTS 5,167,063 A * 12/1992 Hulsink ................ H01F 27/322 29/605
2013/0021127 A1* 1/2013 Sarver .................. H01F 27/327 29/605
2021/0319930 A1* 10/2021 Trimmel .............. H01F 27/322

FOREIGN PATENT DOCUMENTS

CN 1244288 A 2/2000
CN 101379156 A 3/2009
(Continued)

OTHER PUBLICATIONS

International Search Report and Written Opinion of the International Searching Authority, PCT/E P2022/050259, mailed May 25, 2022, 19 pages.
(Continued)

*Primary Examiner* — Kenneth Whittington
(74) *Attorney, Agent, or Firm* — Sage Patent Group

(57) ABSTRACT

A spacer tape is provided for spacing apart turns of a winding, which comprises a tape having an upper surface, a lower surface and a longitudinal axis, wherein the lower surface is adhesable and configured to be adhered to a conductor forming a turn of the winding, and spacers with an upper surface and a lower surface arranged on the tape, wherein the lower surface of the spacers is adhered to the
(Continued)

upper surface of the tape, and wherein the upper surface of the spacers are adhesable and configured to be adhered to the conductor forming an adjacent turn of the winding.

20 Claims, 4 Drawing Sheets

(51) Int. Cl.
*C09J 7/38* (2018.01)
*H01F 41/12* (2006.01)

(52) U.S. Cl.
CPC .... *C09J 2203/326* (2013.01); *C09J 2301/124* (2020.08); *C09J 2301/204* (2020.08); *C09J 2301/416* (2020.08); *C09J 2401/00* (2013.01)

(58) Field of Classification Search
CPC ............ C09J 2301/124; C09J 2301/204; C09J 2301/416; C09J 2401/00; C09J 7/30
See application file for complete search history.

(56) References Cited

FOREIGN PATENT DOCUMENTS

| | | | | | |
|---|---|---|---|---|---|
| CN | 104854664 | A | | 8/2015 | |
| CN | 205122221 | U | | 3/2016 | |
| CN | 106463217 | A | | 2/2017 | |
| CN | 112136222 | A | | 12/2020 | |
| GB | 551450 | A | | 2/1943 | |
| GB | 2118483 | A | | 11/1983 | |
| JP | H069462 | Y2 | * | 3/1994 | |
| JP | 2001143937 | | * | 5/2001 | |
| JP | 2002064125 | A | | 2/2002 | |
| JP | 2004115028 | A | | 4/2004 | |
| JP | 2013010901 | A | | 1/2013 | |
| KR | 10-2012-0051091 | A | | 5/2012 | |
| SE | 1951171 | A | * | 10/2019 | ............ H01F 27/30 |
| WO | 2016073576 | A1 | | 8/2016 | |
| WO | 2018215434 | A1 | | 11/2018 | |
| WO | 2019238558 | A1 | | 12/2019 | |
| WO | 2021151610 | A1 | | 8/2021 | |

OTHER PUBLICATIONS

Anonymous: "Adhesable—Definition and More from the Free Merriam-Webster Dictionary", Merriam Webster online dictionary, May 28, 2021 (May 28, 2021), XP055808585, 5 pages.
Anonymous: "Neologism", Wikipedia, Nov. 8, 2021 (Nov. 8, 2021), 6 pages.
Indian Examination Report, Indian Application No. 202247075487, mailed Jan. 21, 2025, 5 pages.
Korean Office Action and Translation, Korean Patent Application No. 10-2022-7046206, mailed Jul. 15, 2024, 11 pages.
First Office Action for Chinese Patent Application No. 202280005312.4, mailed Mar. 15, 2024, 8 pages.
He, et al. "Automating fluid delivery in a capillary microfluidic device using low-voltage electrowetting valves," University of Massachusetts Amherst, Amherst MA, USA, Dec. 20, 2013, 8 pages.
Wang, et al. "FEA-based calculation of leakage inductance for high-voltage high-power E-core transformer", Electric Power Automation Equipment, National Laboratory of Power Electronics, Zhejiang University, Hangzhou, China, vol. 33 No. 2, Feb. 2013, 6 pages.

* cited by examiner

SPACER TAPE, METHOD FOR MANUFACTURING A WINDING AND WINDING

CROSS REFERENCE TO RELATED APPLICATIONS

This application is a 35 U.S.C. § 371 national stage application of PCT International Application No. PCT/EP2022/050259 filed on Jan. 7, 2022, which in turn claims priority to European Patent Application No. 21150953.4, filed on Jan. 11, 2021, the disclosures and content of which are incorporated by reference herein in their entireties.

TECHNICAL FIELD

The present disclosure relates to a spacer tape, a method for manufacturing a winding and the winding.

BACKGROUND

Windings and coils can be subjected to large electromagnetic forces in a longitudinal, a radial and a tangential direction of the winding. Depending on the winding itself, these forces can lead to distortions of the turns or even short-circuits in between the turns of the windings, unless measures have been taken into account for the design of the winding. Moreover, a challenge for windings in power transformers, which are subjected to huge electromagnetic forces, is the heat management to ensure enough cooling.

Exemplarily, spacer elements are located in between turns of the winding in order to space the turns of the windings apart and to form channels enabling a coolant to pass through the winding. Moreover, as the spacer also become a part of the structure of the winding, the precise arrangement of the spacer in the winding, and the robustness of the spacers are big factors which influences the stability and the endurance of the winding enormously.

A common method for manufacturing windings consists in winding a conductor so that the winding has a plurality of adjacent turns arranged along a longitudinal direction. Often the channels for the coolant are obtained by arranging spacer in between the turns of winding. During the winding process each of the spacers is usually inserted manually between turns. Hence, the rotation during the winding process has to be halted for at least each turn, or even for each spacer element.

As arranging or adhering the spacer elements manually during the winding process is very laborious, time consuming and even hazardous, more modern approaches try to use conductors, which already comprise spacers. The spacer elements might be fixed along a suitable lateral surface of the conductor intended to form the turns of the winding. Therefore, the spacer elements are arranged in between each turn automatically while winding the conductor making the manual process for arranging the spacer elements obsolete.

Nevertheless, a winding comprising a conductor with spacers most often can have stability issues as the spacers can be arranged relatively loose in between the turns. Especially tangential forces in the winding, which can shift adjacent turns of the winding relatively to each other and also the spacers, can threaten the stability of the winding and results in a reduced withstand power.

The above-illustrated technical issue may lead to a dangerous unbalancing condition of the overall winding, which may cause its collapse if subjected to large electromagnetic forces during operation.

SUMMARY

The object of the present disclosure is to provide a spacer tape for a winding which allows the above-mentioned technical issues to be overcome, a winding and a method for manufacturing the winding.

This object is solved by the features of the independent claims.

A spacer tape is provided for spacing apart turns of a winding, which comprises a tape having an upper surface, a lower surface and a longitudinal axis, wherein the lower surface is adhesable and configured to be adhered to a conductor forming a turn of the winding, and spacers with an upper surface and a lower surface arranged on the tape, wherein the lower surface of the spacers is adhered to the upper surface of the tape, and wherein the upper surface of the spacers are adhesable and configured to be adhered to the conductor forming an adjacent turn of the winding.

Since the lower surface of the tape is adhesable, the tape can be conveniently applied to a conductor a winding is formed with. The spacer is adhered to the tape, thereby fixing the position and the orientation of the spacer on the tape and also on the conductor later by. Hence, no deviation in the location of the spacers in the winding arise and the design of the winding becomes as intendent. The adhesable upper surface of the spacers adhere to an adjacent turn of the winding, after the winding is formed by the conductor. Therefore, because the tape is configured to adhere adjacent turns of the winding, a winding utilizing the spacer tape can withstand high voltages and high power by counteracting tangential forces induced by the winding itself.

The spacers may be arranged on the tape equidistantly along the longitudinal axis. A distance between the spacers can be an integral fraction of the circumference of the winding. Hence, the spacers are arranged along the longitudinal direction of the winding stabilizing the winding against longitudinal forces of the winding. As an example, 6, 8, 12 or 24 spacers can be placed along the circumference of the winding. By adhering the spacer upfront on the tape, before the winding is wound, no deviation of the spacers in the winding is to be expected, leading to the intended robust arrangement of the spacers in the winding.

The spacer can comprise materials based on cellulose fiber or materials based on a polymer. Materials based on cellulose are, for example, used for windings, wherein oil is used as a coolant. As a polymer material, a thermoplastic polymer, e.g., polyetherimide, can be employed, because such a material combines high strength and rigidity, even at elevated temperatures, with long term heat resistance. It should be noted that materials based on polymer can withstand higher tangential forces in the winding compared to cellulose based ones.

Moreover, the spacers may comprise a bonding element at the upper surface and the lower surface. The bonding element may be configured to adhere and to bond the spacers to the conductor. It also may be flat to avoid any detrimental effects on the characteristics of the spacers, as the rigidness. The bonding elements themselves may be adhesable to add them, or to attach the spacers on the tape or the conductor. The bonding elements can additionally be adhered to the spacer element by an adhesive or a UV curable adhesive film. If the bonding element is mouldable, the spacer can be bond to the tape or the conductor by thermal processing or curing.

For example, the bonding element can comprise a polymer. Most polymers are mouldable at high temperatures, such that the spacer can be bonded to the conductor with a thermal curing process. If the spacer comprises a polymer and the bonding element comprises a polymer, the spacer can be remarkably durable as the bonding elements adhere well. Likewise, as polymers often have similar thermal expansion coefficients, thermally induced tension between the spacer and the bonding element can be minimized.

Besides, the bonding elements may comprise a reinforcement material. Particularly if the bonding element is polymer based, a reinforcement material can enhance the rigidness and stiffness of the bonding element as well as of the spacers. Suitable reinforcement materials are fibres made out of glass, carbon, basalt or aramid.

The dimension of the bonding elements in a direction perpendicular to the longitudinal axis of tape can be larger than the dimension of the tape. Hence, the bonding elements protrude from the sides of the tape and can bond directly to the conductor the tape if adhered to, while being fixed locally by the tape.

The bonding elements can have a distance of at least 1 mm to the edge of the spacers in order to ensure a sufficient safety distance from the bonding elements to the edge of the spacers to avoid spout of any adhesive or of the bonding element, which in turn could compromise the insulation on the conductor or of the winding.

The upper surface of the tape can be adhesable, whereby the spacers may be adhered to the tape by the adhesable upper surface of the tape, or the spacers can be adhered to the tape by an adhesive applied to the lower surface of spacers. The adhesable upper surface of the tape can be realized by an adhesive layer on the tape. For fixing the spacer to the tape, the spacer conveniently has to be arranged on it. For fixing the spacer to the tape by an adhesive, the adhesive is first applied to the lower surface of the spacers, which is then positioned on the tape. A benefit of applying the spacer on the tape by an adhesive is that the exact position of the spacer on the tape can be corrected awhile after the placement.

Furthermore, a removable protective layer can be arranged on the upper surface of the spacers. In this way the adhesable upper surface of the spacer, but also the whole spacer tape, is protected from environmental influences, e.g., as dust. Accordingly, the spacer tape can be transported conveniently to the manufacturing place of the winding and be applied to the conductor.

The spacers may comprise an UV curable adhesive film. The UV curable adhesive film may be arranged directly on the spacers or on a bonding element. The UV curable adhesive film can be fixed to the spacer by arranging the UV curable adhesive film on the spacer and curing the UV curable adhesive film at the edges or corners. In a further step the spacer comprising the UV curable adhesive film can be adhered to the tape by UV curing a spot on the UV curable adhesive film, that has not been cured before, and that the tape is arranged on, e.g., in the middle of the spacer.

An advantage of the spacer tape is the method for manufacturing a winding. Compared to common methods for manufacturing winding, in which each of the spacer elements have to be inserted manually between each pair of adjacent turns, the presented method is faster and more efficient, as halting the winding process is not necessary due to the spacers already adhered to the conductor. Moreover, as the spacer tape can be manufactured apart from the winding, the spacer tape can be produced under more controlled conditions.

The method for manufacturing a winding, comprises the following steps:

a) Arranging a spacer tape according to an embodiment described above on a conductor such that an adhesable lower surface of the tape is adhered to the conductor;
b) Winding of the conductor forming the turns of the winding such that the spacers are arranged in between adjacent turns of the winding and are adhered to the adjacent turn of the winding.

Additionally, the method for manufacturing the winding can comprise the additional following step:

c) Thermal curing of the winding such that the spacers bond to the adjacent turns.

Applying a thermal curing process to the winding can be in particular interest, if the spacers comprise bonding elements that are curable or if the spacer themselves can be bonded over a thermal curing process. During thermal curing the spacer can bond to the conductor at adjacent runs of the winding. Such a winding can withstand higher voltages and stronger forces, especially tangential.

A winding manufactured by the method above comprises a conductor, forming at least two adjacent turns of the winding, and a spacer tape as described above, wherein the spacer tape is arranged in between the adjacent turns such that the spacer tape is adhered to both adjacent turns.

Also, the spacer tape may be bonded to adjacent turns of the winding. Therefore, the whole winding is more robust and can withstand stronger electromagnetic forces, and as a result also higher electrical energy.

BRIEF DESCRIPTION OF THE DRAWINGS

In the following the present disclosure is described based on embodiments with reference to the figures. Same parts or parts with equivalent effect are referred to by the same reference numbers.

The figures serve solely to illustrate the present disclosure and are therefore only schematic and not drawn to scale. Some parts may be exaggerated or distorted in the dimensions. Therefore, neither absolute nor relative dimensions can be taken from the figures. Identical or identically acting parts are provided with the same reference numerals.

DETAILED DESCRIPTION

Figure 1:
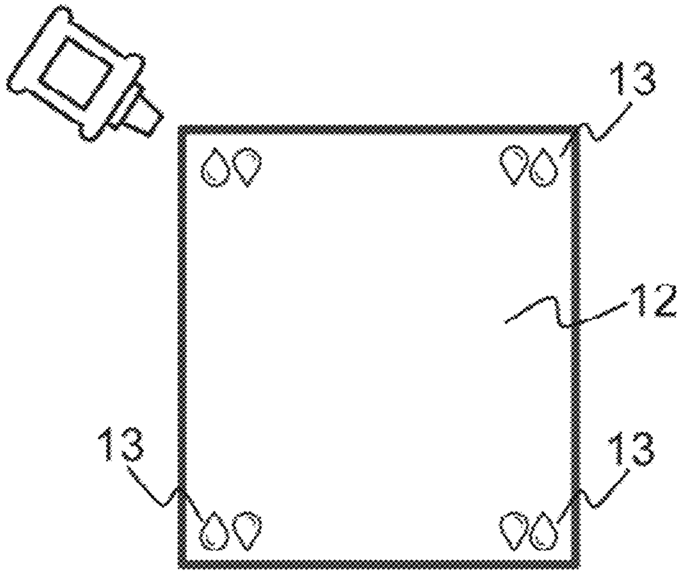
FIG. 1 shows a plain view of a bonding element, on which an adhesive is applied.

FIG. 1 shows a plain view of a bonding element 12, on which an adhesive 13 is applied. The adhesive 13 is applied to the four corners of the rectangular bonding element 12 in order to fix the bonding element 12 to a spacer 9 later on. The adhesive 13 can be an instantaneous glue, but also could be any other glue or paste having good adhesive properties on the surface of the bonding element 12 facing the spacers 9.

The bonding element 12 consists of epoxy and can be reinforced with glass fibers to enhance the stability of the bonding elements 12. Under usual conditions, e.g., room temperature, the bonding element 12 is stiff. Thus, it becomes sticky under thermal processing. Therefore, the bonding elements 12 can be employed to bond to a conductor 6 by a thermal curing.

Figure 2:
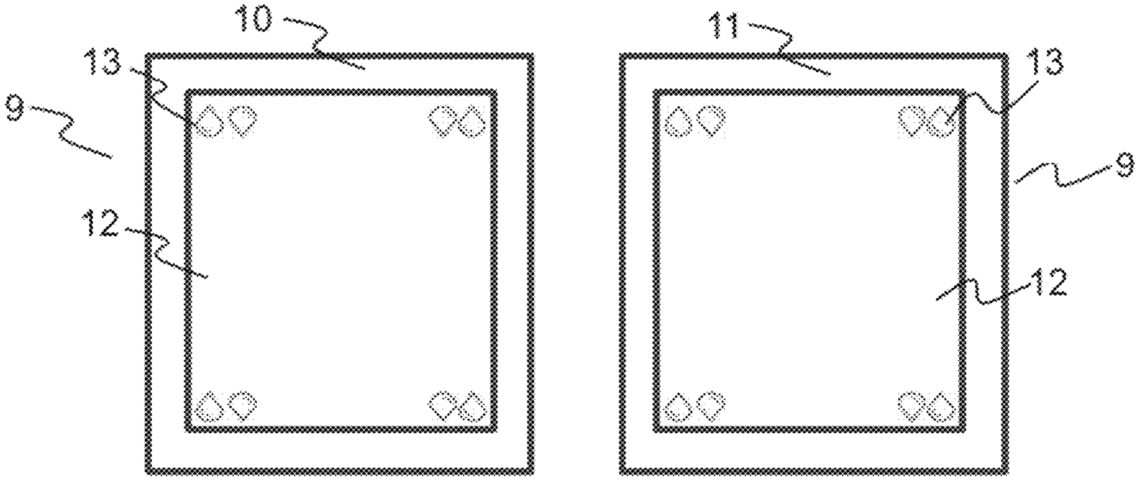
FIG. 2 shows a plain view of an upper surface and a lower surface of a spacer.

FIG. 2 shows a plain view of an upper surface 10 and a lower surface 11 of the spacer 9 after the bonding elements 12 have been adhered to the spacers 9 by the adhesive 13 dispensed at the corners of the bonding element 13. A safety distance of the bonding element 12 to the edges of the spacers 9 of at least 1 mm is maintained in order to avoid the adhesive 13 to be spilled on the conductor 6 later on, which could compromise the insulation of the conductor or of the winding.

Figure 3:
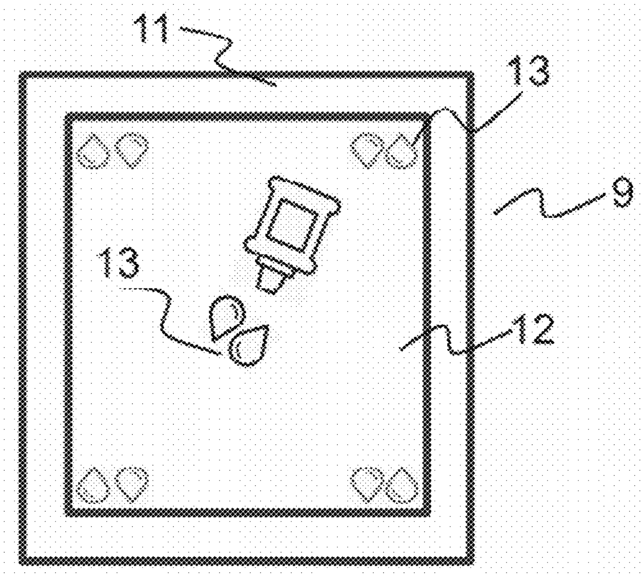
FIG. 3 shows a plain view of a lower surface of a spacer, on which an UV curable adhesive film is applied.
Figure 4:
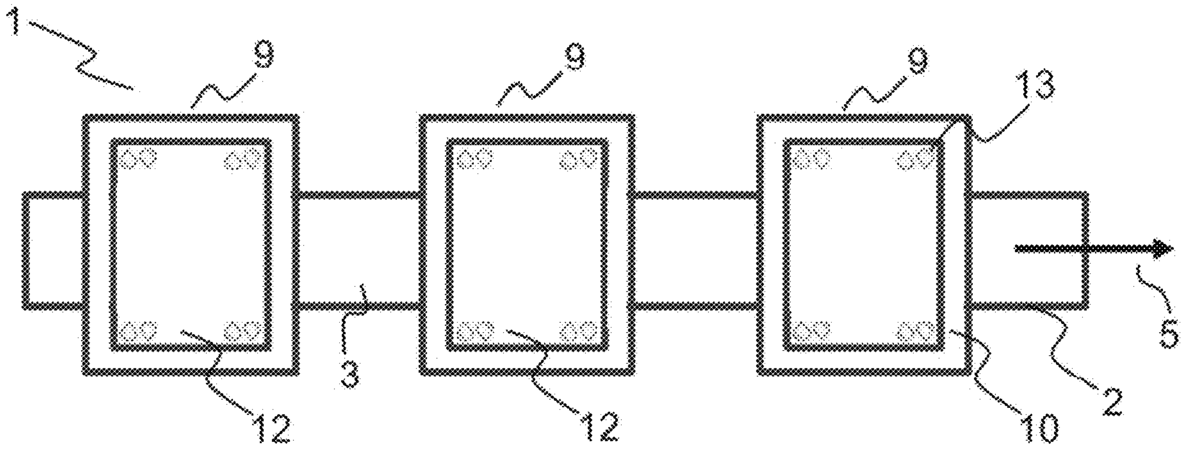
FIG. 4 shows a plain view of an embodiment of spacer tape.
Figure 7:
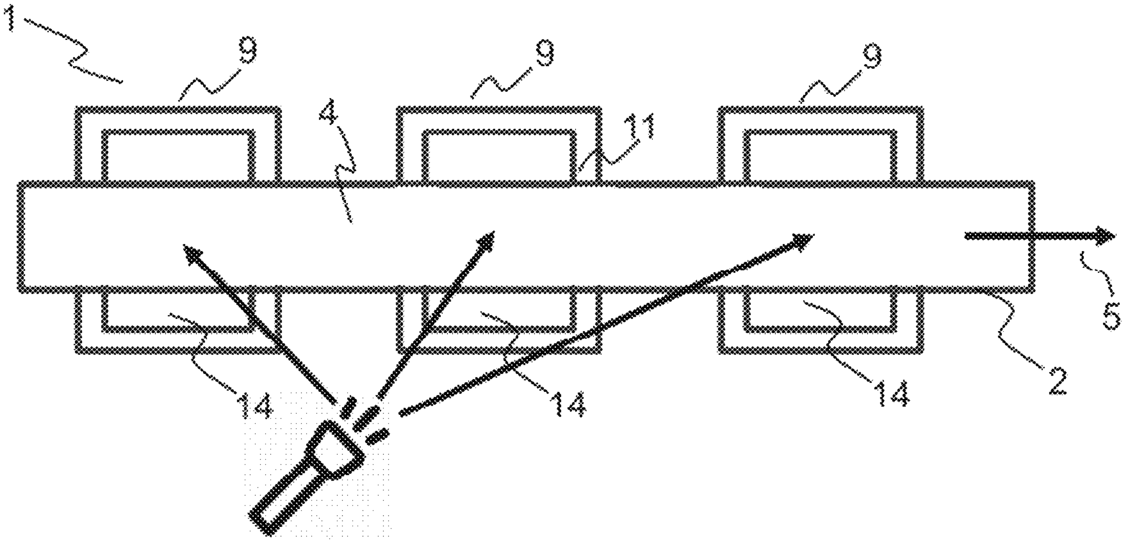
FIG. 7 shows a plain view of a spacer tape, wherein an UV curable adhesive film is used.

In FIG. 3 a plain view of the lower surface 11 of the spacer 9 is displayed, on which the adhesive 13 is applied in the middle of the bonding element 12. Hence, after positioning a tape 2 as shown in FIG. 4, comprising an adhesable lower surface 4 as shown in FIG. 7, on a planar surface, the spacer can be fixed to a no-adhesable upper surface 3 of the tape 2 by the adhesive 13 in the middle of the bonding element 12. Alternatively, the upper surface 3 of the tape 2 can be adhesable, for example by an adhesive layer, such that the spacers 9 can be fixed to the tape 2 without an additional adhesive 13 by arranging them directly on the tape 2.

Figure 8:
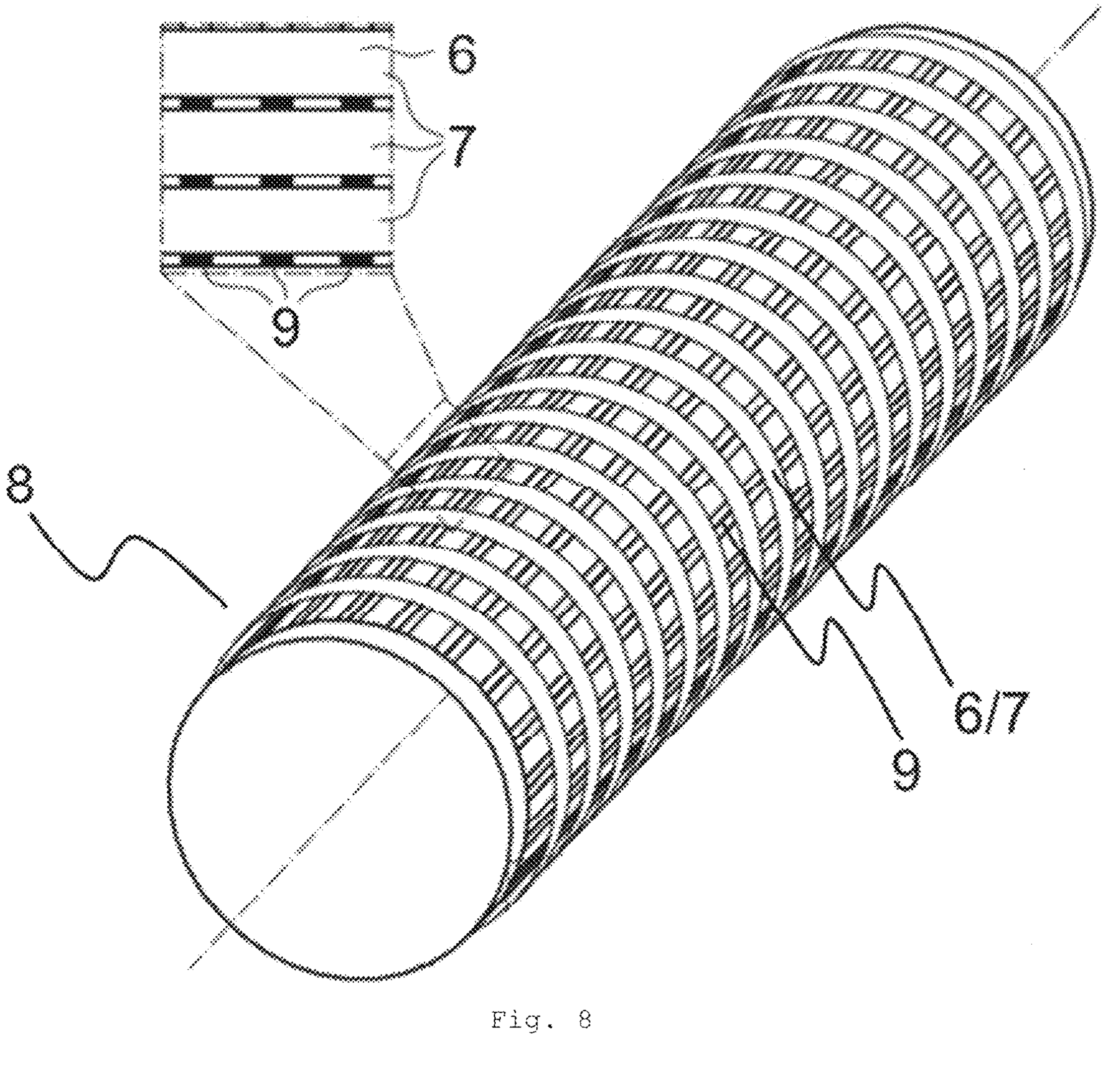
FIG. 8 shows a winding comprising a spacer tape.

FIG. 4 shows a plain view of an embodiment of a spacer tape 1. The spacers 9 are adhered to the upper surface 3 of the tape 2 equidistantly. The distance between the spacers 9 along a longitudinal axis 5 of the tape 2 is a natural fraction of a circumference of a winding 8 as shown in FIG. 8, the spacer tape 1 is used in. In this way, it is ensured that the spacers 9 are stacked on top of each other in the winding 8, whereby turns 7 of the winding 8 are positioned between them. The dimension of the bonding elements 13 in a direction perpendicular to the longitudinal axis 5 of tape 2 are larger than the dimension of the tape 2 in this direction. Consequently, as the spacer are centered on the tape 2, the bonding elements 13 protrude from the tape 2 on two sides. Therefore, after the spacer tape 2 is adhere to the conductor 6 as shown in FIG. 8, the bonding elements 12 can bond directly to the conductor 6 at the area without tape 2, while being secured in position by the tape 2.

Figure 5:
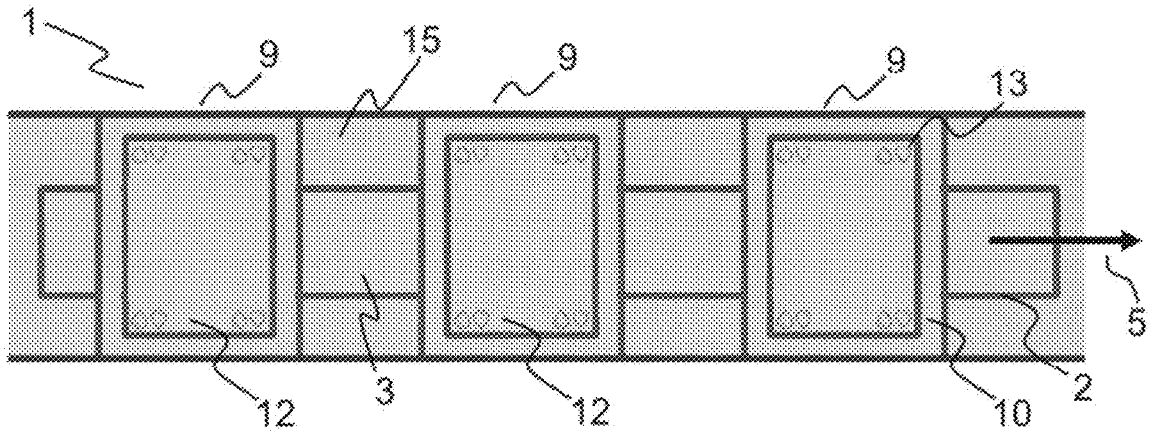
FIG. 5 shows a plain view of a spacer tape, on which a protective layer is arranged.

In FIG. 5 the spacer tape 1 is shielded by a protective layer 15 which is arranged on the upper surface 11 of the spacer 9. The protective layer 15, which can be a plastic layer, conserves the adhesive property of the upper surface 11 of the spacer 9 from any dirt or dust. Moreover, protected by the protective layer 15, the spacer tape 1 can be easily transported.

Figure 6:
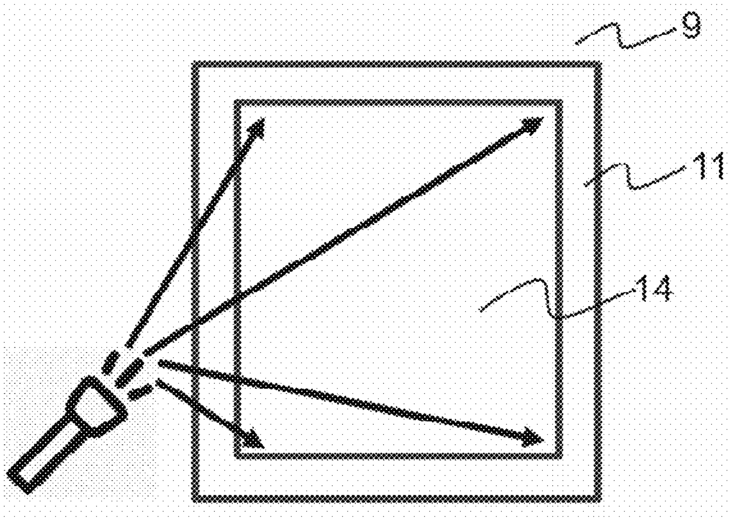
FIG. 6 shows an alternative embodiment, wherein an UV curable adhesive film is used.

FIG. 6 shows a plain view of a lower surface 11 of a spacer 9, on which an UV curable adhesive film 14, in contrary to the bonding element 12, is applied to make the lower surface 11 of the spacer 9 adhesable. The UV curable adhesive film 14 is fixed to the spacer by curing the UV curable adhesive film 14 just at the corners. The middle of the UV curable adhesive film 14 is omitted at this step to adhere the spacer 9 on the tape 2 over the UV curable adhesive film 14, as indicated in FIG. 7.

FIG. 8 shows the winding 8 comprising the spacer tape 1. The spacer tape 1 has been adhered to the conductor 6, after which the conductor 7 was wound to form the turns 7 of the winding 8, such that the spacers 9 are arranged in between them to space the turns 7 apart. Thereafter, the whole winding 8 has been subjected to a thermal curing process, whereby the spacers 9 bond to both adjacent turns 7. As a consequence, the winding 8 is an integral electrical component formed by the conductor 6 and the spacer tape 1 that can withstand much larger electromagnetic forces compared to conventional spacers-type windings 8.

It has to be noticed that the scope of the present disclosure is not limited to the layouts described before and that further layouts can be retrieved by combination of features taken from different figures and embodiments.

The invention claimed is:

1. A spacer tape for spacing apart turns of a winding comprising, a tape having an upper surface, a lower surface and a longitudinal axis, wherein the lower surface is adhesable and configured to be adhered to a conductor forming a turn of the winding, and spacers with an upper surface and a lower surface arranged on the tape, wherein the lower surface of the spacers is adhered to the upper surface of the tape, wherein the upper surface of the spacers are adhesable and configured to be adhered to the conductor forming an adjacent turn of the winding, wherein the spacers comprise a bonding element at the upper surface and the lower surface, and wherein the dimension of the bonding elements in a direction perpendicular to the longitudinal axis is larger than the dimension of the tape.

2. The spacer tape according to claim 1, wherein the spacers are arranged on the tape equidistantly along the longitudinal axis.

3. The spacer tape according to claim 1, wherein the spacers comprise materials based on cellulose fiber or materials based on a polymer.

4. The spacer tape according to claim 1, wherein the bonding elements comprise a polymer.

5. The spacer tape according to claim 1, wherein the bonding elements comprise a reinforcement material.

6. The spacer tape according to claim 1, wherein the bonding elements have a distance of at least 1 mm to the edge of the spacers.

7. The spacer tape according to claim 1, wherein the upper surface of the tape is adhesable, and wherein the spacers are adhered to the tape by the adhesable upper surface of the tape, or wherein the spacers are adhered to the tape by an adhesive applied to the lower surface of the spacers.

8. The spacer tape according to claim 1, wherein the spacers comprise an UV curable adhesive film.

9. The spacer tape according to claim 1, wherein a removable protective layer is arranged on the upper surface of the spacers.

10. A method for manufacturing a winding comprising the following steps:

arranging a spacer tape according to claim 1 on a conductor such that an adhesable lower surface of the tape is adhered to the conductor;

winding of the conductor forming turns of the winding such that spacers are arranged in between adjacent turns of the winding and are adhered to the adjacent turn of the winding.

11. The method for manufacturing a winding according to claim 10 comprising the additional following steps:

thermal curing of the winding such that the spacers bond to the adjacent turns.

12. A winding comprising, a conductor forming at least two adjacent turns of the winding, a spacer tape according to claim 1, wherein the spacer tape is arranged in between the adjacent turns such that the spacer tape is adhered to both adjacent turns.

13. A winding according to claim 12, wherein the spacer tape is bonded to both adjacent turns.

14. The winding according to claim 12, wherein the spacers are arranged on the tape equidistantly along the longitudinal axis.

15. The winding according to claim 12, wherein the spacers comprise materials based on cellulose fiber or materials based on a polymer.

16. The winding according to claim 12, wherein the bonding elements comprise one of a polymer and a reinforcement material.

17. The winding according to claim 12, wherein the bonding elements have a distance of at least 1 mm to the edge of the spacers.

18. The winding according to claim 12, wherein the upper surface of the tape is adhesable, and wherein the spacers are adhered to the tape by the adhesable upper surface of the tape, or wherein the spacers are adhered to the tape by an adhesive-applied to the lower surface of the spacers.

19. The winding according to claim 12, wherein the spacers comprise an UV curable adhesive film.

20. The winding according to claim 12, wherein a removable protective layer is arranged on the upper surface of the spacers.

* * * * *